April 27, 1937.  F. G. ELDRIDGE  2,078,375

CHECK VALVE

Filed July 24, 1935

INVENTOR.
Frank G. Eldridge
BY Darby & Darby
ATTORNEYS.

Patented Apr. 27, 1937

2,078,375

UNITED STATES PATENT OFFICE 2,078,375

CHECK VALVE

Frank G. Eldridge, Newburgh, N. Y.

Application July 24, 1935, Serial No. 32,861

2 Claims. (Cl. 251—124)

This invention relates to improvements in check valves.

The prime object of the invention is to provide a check valve construction involving a novel combination of the construction of the valve casing and the valve disc for cooperation in a manner to prevent the valve disc from moving to closed or seated position so rapidly as to cause it to slam.

A further object is to provide a check valve construction in which the valve disc upon reversal of the fluid flow therethrough, will move to closed or seated position slowly.

A still further object is to provide a check valve in which the valve disc moves to seated position first at a fairly rapid rate, and then at a gradually decreasing rate until seated.

These and the other objects of this invention will become apparent to those skilled in the art as the following description of the details of the construction proceeds.

This invention resides substantially in the combination, construction, arrangement and relative location of parts, all as will be set forth in the following specification in conjunction with the attached drawing and defined in the appended claims.

Figure 1:
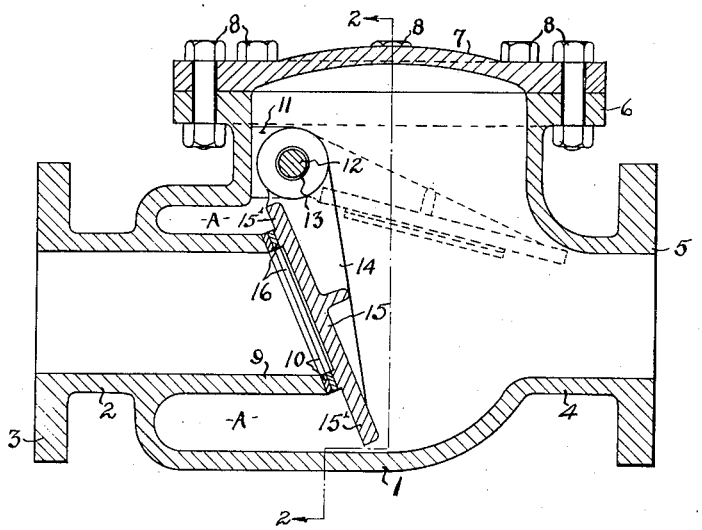
Figure 1 is a vertical, longitudinal cross-sectional view on the line 1—1 of Fig. 2.

In the usual check valve in which no provision is made to prevent it, the valve disc moves to closed position so rapidly upon reversal of the fluid flow through the valve casing, that the disc is slammed onto its seat making an undesirable noise and tending to shock and strain the seating surfaces. As a result of the slamming of the valve disc on to its seat, the reversely flowing fluid is suddenly checked in its movement as the valve seats, causing a water knock in the piping system and subjecting it to abnormal pressures, and as a result, extreme shock.

The general object of this invention is to provide an automatic check valve provided with means whereby upon the reversal of fluid flow through the valve body the valve disc seats at such a slow rate as to eliminate slamming, fluid shocks and a generation of abnormal and undesirable pressures.

Referring to the drawing the valve comprises a casing 1 constructed of any suitable material and of such a configuration and size as the particulars of its use dictate. The valve body 1 terminates at its inlet portion in a neck 2 of suitable size and cross section having a flange or other coupling member 3 formed on the end thereof. The outlet end of the casing converges to a neck or nozzle 4 which is likewise provided with a flange or other suitable coupling member 5 in accordance with common practice.

The upper portion of the casing is provided with a flange end 6 to which a removable cover 7 is attached with a fluid tight seal by means of bolts and nuts 8 in accordance with standard practice. The removable cover permits of ready access to the interior of the valve casing for adjustments, repairs and replacements.

Cast or otherwise suitably formed, or mounted upon the interior of the casing towards the top, are a pair of lugs or bosses 11 in which is mounted a pivot rod or shaft 12. As is clear from Fig. 2, the bosses 11 are provided with bores which extend entirely through the casing and are closed by means of screw plugs 17. This permits of ready insertion and removal of the shaft 12 from a point exterior of the housing.

The valve disc is pivotally mounted upon the shaft or rod 12 in any suitable manner. As illustrated the valve disc 15 is provided with a pair of ribs or arms 14 terminating in apertured collars which are bushed with the sleeves 13. With this arrangement the valve disc is pivotally mounted upon the shaft 12 so that it may swing thereabout as a center.

The valve disc 15 is provided with a facing ring 16 which cooperates with a facing ring 10 mounted on the end of the tube 9 which is integral with the casing and projects thereinto as is clear from Figure 1. The particular form of seating members and their method of attachment, form no part of this invention and may be made in a number of well known ways. It is to be particularly noted that the internally projecting tube 9 is spaced from the inner wall of the valve casing 1 to form an annular chamber which is designated by the reference character A. The valve disc is provided with a projecting rim 15' which extends beyond the seating ring around the entire periphery of the disc so as to substantially close off, when the disc is seated, the end of the annular chamber A adjacent the seat. As is clear from Figure 1, even when the dsc is seated, its overall diameter is such as to leave a small space between it and the valve housing.

In the operation of the valve fluid normally flows from the left hand end through the neck 2 and tube 9 so as to bear against the valve disc 15 and to move it up into the position shown in Figure 1. The flow of fluid then continues through the casing and discharges through the nozzle end 4. When the supply of fluid is cut off, the fluid to the right of the valve disc and in the discharge piping rapidly reverses in its direction of flow causing the valve disc 15 to move towards seating position and aiding its natural tendency to close under the action of gravity. The annular chamber A is thus completely filled with the fluid (if not already filled). As the valve disc approaches nearer and nearer to its seat, the pressure of the fluid in the annular chamber acting on the rim 15' more and more resists closing movement of the disc thereby slowing it down. Because of the approach of the disc to its seat, the quantity of fluid escaping into the inlet gradually diminishes. At the same time the fluid in chamber A becomes more and more restricted in its escape so that it acts on the rim 15' of the disc to restrict its closing movement. If the valve disc is not provided with the annular rim 15', the pressure of the fluid acting on the right hand face thereof and tending to seat the disc would be practically unresisted. However, by providing the annular rim the total effective pressure tending to seat the disc diminishes as it approaches closed position because the counter pressure of the fluid more or less trapped in the annular chamber A tends to diminish the effective closing pressure. The effect of this rim will become more apparent when it is realized that the area of the disc increases as the square of the diameter; for example the area of the disc within the seating diameter, assuming a diameter of four inches is approximately 12.6 square inches. If the diameter of the outer rim is eight inches, the area of the disc is 50.3 square inches or four times its previous value. Thus there is much more area defined by the rim than there is in the portion of the disc defined by the seating diameter.

Figure 2:
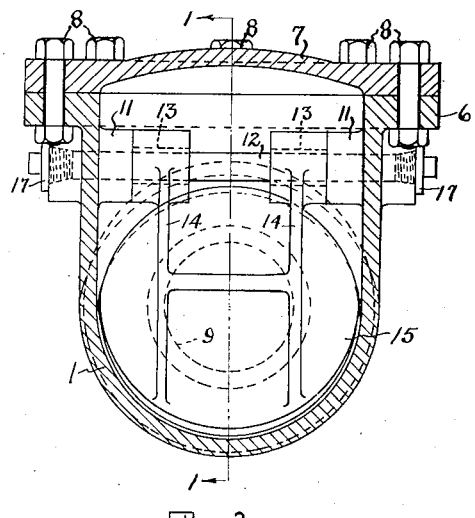
Fig. 2 is a vertical, transverse cross sectional view taken on the line 2—2 of Figure 1.

As is clear from Fig. 2 the casing is shaped with respect to the outline of the valve disc so that the movement of the disc tends to trap the fluid in the annular chamber A which may only escape around the rim of the valve disc.

It is apparent that this invention may readily find use in multiple check valves.

From the above description it will be apparent that this invention resides in certain principles of construction and operation which may be embodied in other physical forms and carried out in other ways by those skilled in the art without departure from the scope thereof. It is quite apparent therefore, that I do not desire to be strictly limited to the particular form of the invention as given for purposes of illustration, but rather to the scope of the appended claims.

What I seek to secure by United States Letters Patent is:

1. A check valve comprising a casing having an inlet and an outlet port, said casing having a reentrant portion terminating in a seat and forming with the adjacent walls of the casing an open ended annular chamber extending entirely around the reentrant portion and a valve disc pivotally mounted in the casing so as to be engageable with said seat, said disc positioned wholly to one side of the pivotal mounting and extending radially beyond the seat when closed and forming a substantial closure for said chamber whereby the fluid trapped in the chamber as the disc approaches its seat retards its closing movement.

2. A check valve comprising a casing having a reentrant portion terminating in a seat and forming with the adjacent walls of the casing an open ended chamber extending entirely around the reentrant portion, and a valve disc pivotally mounted in the casing so as to be engageable with said seat, said disc being positioned wholly to one side of this pivotal mounting, and extending radially beyond the seat when closed and forming a substantial closure for said chamber, whereby the fluid trapped in the chamber as the disc approaches its seat retards its closing movement.

FRANK G. ELDRIDGE.